Jan. 4, 1949.   R. H. STORCH   2,458,114
LAYOUT PROTRACTOR
Filed May 16, 1947
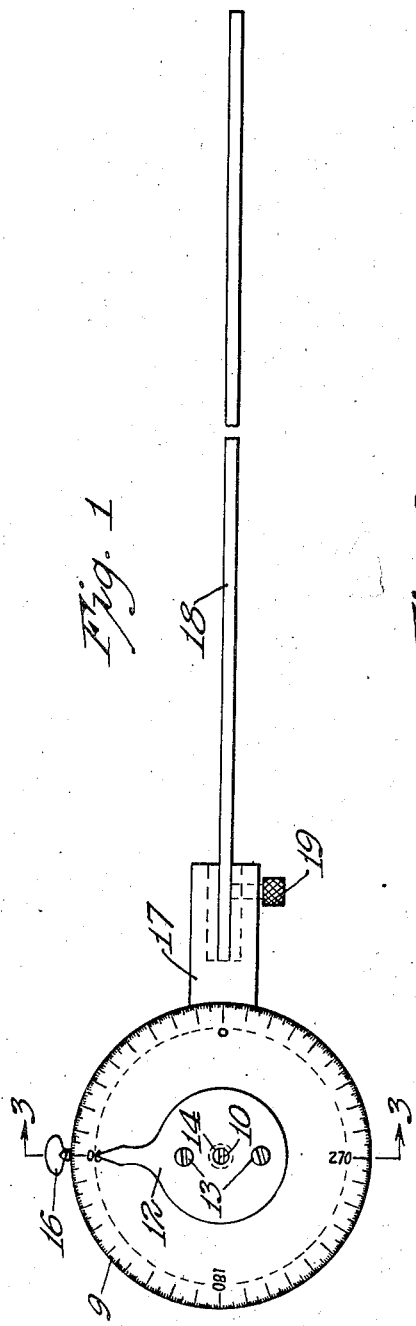
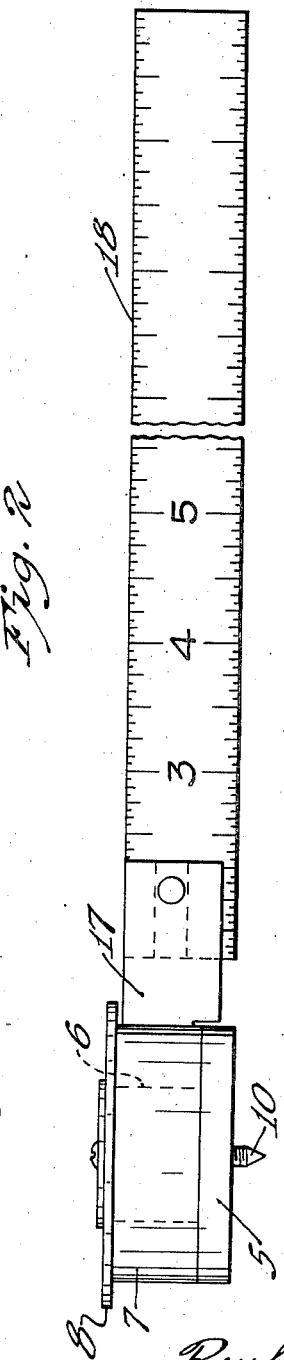
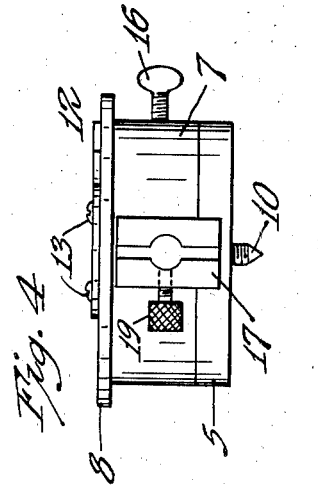
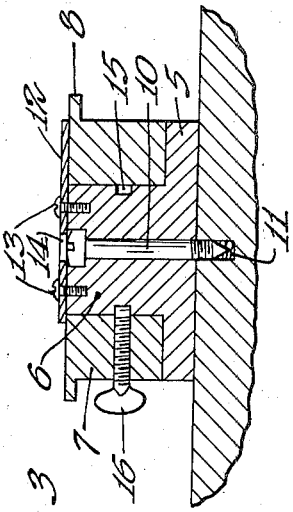
Inventor
Reuben H. Storch
By Williamson & Williamson
Attorneys Patented Jan. 4, 1949

2,458,114

UNITED STATES PATENT OFFICE 2,458,114

LAYOUT PROTRACTOR

Reuben H. Storch, Minneapolis, Minn.

Application May 16, 1947, Serial No. 748,404

2 Claims. (Cl. 33—75)

This invention relates to layout protractors particularly adapted for layout work on large flat surfaces.

It is an object of my invention to provide a layout protractor for laying off any desired angles on a flat surface.

It is another object to provide a layout protractor so designed that the wear between the parts is reduced to a minimum.

It is a further object to provide a simple yet highly efficient extremely smoothly operating layout protractor having a portion thereof adapted to be secured to the work and having a rotatable member and means for accurately indicating the angle laid off and for positively locking said rotatable member in any desired position.

These and other objects and advantages of my invention will more fully appear from the following description made in connection with the accompanying drawings wherein like reference characters refer to similar parts throughout the several views and in which:

Figure 1 is a top plan view of the layout protractor embodying my invention;

Figure 2 is a side elevational view of the protractor shown in Figure 1;

Figure 3 is a transverse vertical sectional view taken substantially on the line 3—3 of Figure 1; and Figure 4 is a front end elevational view of the device shown in Figure 1 with the scale removed.

As illustrated in Figures 1 through 4, I provide a layout protractor having a stationary base 5 with an upstanding spindle 6 formed integrally therewith and concentrically disposed thereto, spindle 6 being of lesser diameter than base 5.

A rotatable member 7 having a central bore adapted to receive spindle 6 is journaled on said spindle 6 for 360-degree rotation thereon.

The extreme top of rotatable member 7 has an indicia flange 8 formed thereon and extends concentrically outwardly around the periphery thereof. A 360-degree angular scale 9 is engraved into the top surface adjacent the outer periphery of said indicia flange 8.

The center of spindle 6 and base 5 is drilled out and has a securing pin 10 passing therethrough. The top portion of spindle 6 is countersunk to receive the head of securing pin 10 and the pin 10 is free to be rotated within the drilled shaft through the spindle 6 and base 5. The lower end of the pin 10 is threaded and is also pointed, adapting it to be secured into a tapped hole in the work, such as the hole 11 as shown in Figure 3. The head of the pin 10 is slotted so that it may be turned and thus secure the base 5 tightly down upon the work.

A pointer 12 is secured to the top of spindle 6 as by the screws 13 and has a central aperture 14 therein which is slightly smaller than the head of the pin 10 but which will permit a tool to be inserted therethrough for turning the pin 10.

At any point intermediate the top and the bottom of spindle 6 a horizontal groove 15 is cut into the vertical peripheral surface of the spindle 6 and a horizontal tapped passage is formed through the side of rotatable member 7 and is aligned with the groove 15. A thumb set screw 16 is threadably inserted through said horizontal passage and has its inner end extending into the groove 15.

A scale support 17 is fixed to the outer periphery of said rotatable member 7 and extends radially outwardly from the zero marking on the angular scale 9. A longitudinal slot is cut into the end portion of said support 17 and is adaptable to receive a scale arm 18 as shown in Figures 1 and 2. A set screw 19 is provided to securely hold the pointer scale 18 in its proper radially extending position. The end of scale support 17 is also drilled out longitudinally to receive a rod instead of a scale. Said rod would also be held in place by the set screw 19.

The operation of my invention is obvious from the drawings. The pointer 12 is initially set at "zero" on the vernier 9 and the set screw 16 tightened. The base 5 may then be either secured to the work by a tapped hole 11 and the pin 10 screwed therein to securely hold said base 5 against the work, or the pointed end of pin 10 may be merely inserted into a center-punched indenture in the work and the base held in place by the operator. The layout scale 18 is then set at the initial terminus of the angle to be laid out. The thumb set screw 16 is then released and any desired angle may be laid off from the initial starting point, the angle being accurately read on the angular scale 9. The set screw 16 may then be tightened to securely hold the scale 18 in the desired position while the work is marked.

There are two means provided for retaining the rotatable member 7 on the spindle 6, one being the set screw 16, which even though it is not tightened against the groove 15 may extend a slight distance into said groove 15 and prevent member 7 from sliding off the spindle 6; and the other being the pointer 12 with its central disc which holds the central portion of the rotatable member 7 onto the spindle 6.

The integral spindle and base construction with the independently rotatable pin 10 mounted therethrough provides a simple sationary structure which may be securely held against the work and the single rotatable member 7 journaled on said spindle 6 and riding on the top of said base 5 may be smoothly rotated through any angle and by means of said set screw 16 may be positively locked in any desired position, securely holding said scale arm 18 in its set position on the work surface to insure accuracy in marking the laid out angle.

It will be seen that a highly efficient, extremely simple layout protractor has been provided which will operate very smoothly and accurately and which is adapted to a wide variety of layout uses. By using a scale arm 18 standing on edge it is obvious that it will be a great deal easier and more accurate to lay off the desired angles because of the relatively thin upstanding marking edge which extends radially from the rotatable member 7 to accurately lay off the angle indicated on the scale 9. By tightening the set screw 16 the scale arm 18 may be held in any desired position while the work is marked. This materially increases the accuracy of its operation. The large smooth bearing surfaces on which the rotatable member 7 rides prevent excess wear and maintain accuracy throughout long use. By prividing the groove 15 the set screw 16 will be prevented from cutting into the bearing surface of the spindle 6 and will insure smooth operation.

The simplicity of the construction of my invention makes it economical to manufacture and provides a device which is very handy to use, while providing long-wearing parts to maintain a high degree of accuracy of operation for a long period of time.

It will of course be understood that various changes may be made in the form, details, arrangement and proportions of the parts without departing from the scope of my invention.

What I claim is:

1. A layout protractor particularly adapted for laying off angles on a flat surface, comprising a stationary member with an enlarged base portion and a diminished upstanding spindle portion, said spindle portion having a peripheral groove formed therein, a locating and securing pin extending longitudinally through said spindle and said base portion and adapted to secure said member at a predetermined point on the flat surface, a rotatable member journaled on said spindle and riding on said enlarged base portion, a locking and retaining element connected with said rotatable member and adapted to be projected into said groove to retain said rotatable member on said spindle and to selectively hold said rotatable member against rotation on said spindle, means for attaching an arm to said rotatable member whereby any desired angle may be laid off, and means on said spindle and rotatable member for indicating the angle laid off.

2. A layout protractor particularly adapted for laying off angles on a flat surface, comprising a stationary member with an enlarged base portion and a diminished upstanding spindle portion, said spindle portion having a peripheral groove formed therein, a locating and securing pin extending through said stationary member and adapted to secure said member at a predetermined point, a rotatable member journaled on said spindle and riding on said enlarged base portion, a set-screw extending transversely through said rotatable member and adapted to be extended into said groove to securely hold said rotatable member against rotation on said spindle at any desired point, means for attaching an arm to said rotatable member whereby any desired angle may be laid off, a 360-degree angular scale formed in the top outer peripheral surface of said rotatable member, and a pointer secured on said spindle cooperating with said angular scale to indicate the angle laid off, said pointer overlapping the top of said rotatable member to retain the same on said spindle.

REUBEN H. STORCH.

REFERENCES CITED

The following references are of record in the file of this patent:

UNITED STATES PATENTS

| Number | Name | Date |
|---|---|---|
| 918,947 | Boljahn | Apr. 20, 1909 |
| 2,278,440 | Graves | Apr. 7, 1942 |

FOREIGN PATENTS

| Number | Country | Date |
|---|---|---|
| 270,956 | Germany | Feb. 26, 1914 |
| 390,875 | Germany | Feb. 26, 1924 |
| 830,649 | France | May 16, 1938 |